Oct. 13, 1936.  A. B. CRUSH  2,057,419
POWER TRANSMISSION BELT AND METHOD OF MAKING THE SAME
Filed June 12, 1934   2 Sheets-Sheet 1
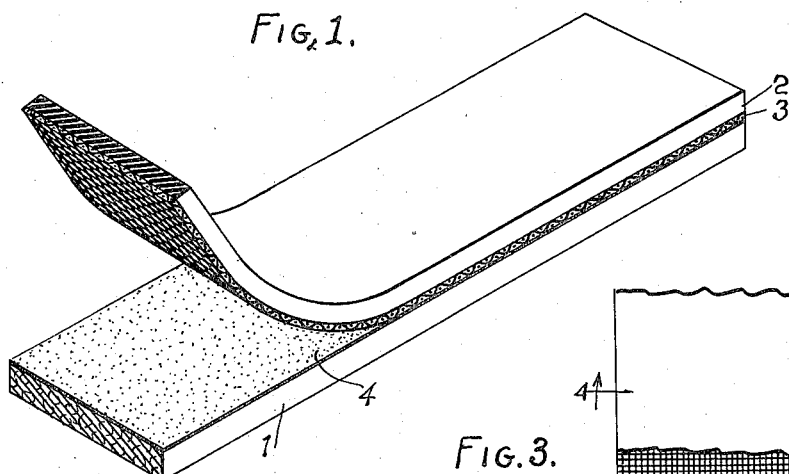
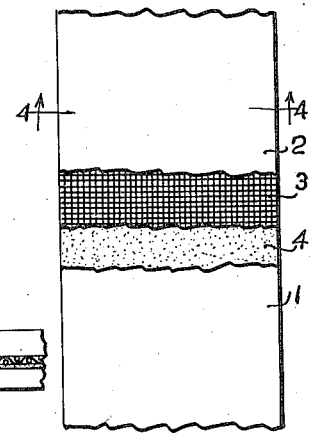
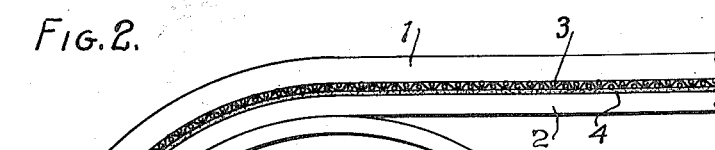
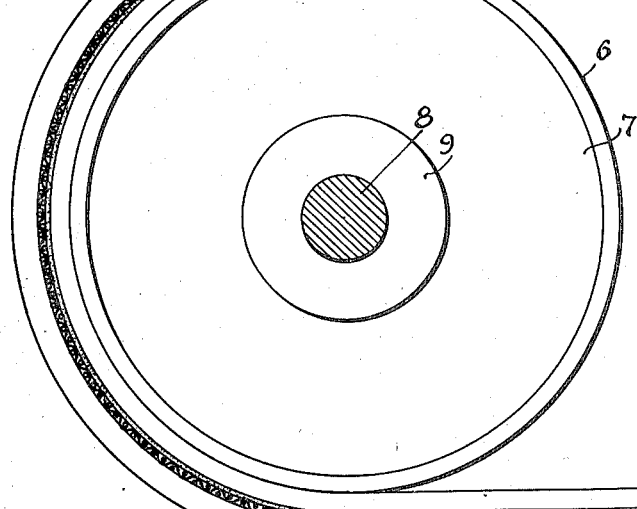
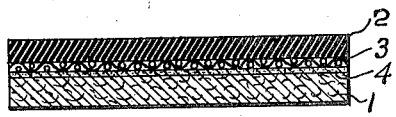
Inventor
ALBERT B. CRUSH,
Attorneys Oct. 13, 1936. A. B. CRUSH 2,057,419
POWER TRANSMISSION BELT AND METHOD OF MAKING THE SAME
Filed June 12, 1934 2 Sheets-Sheet 2
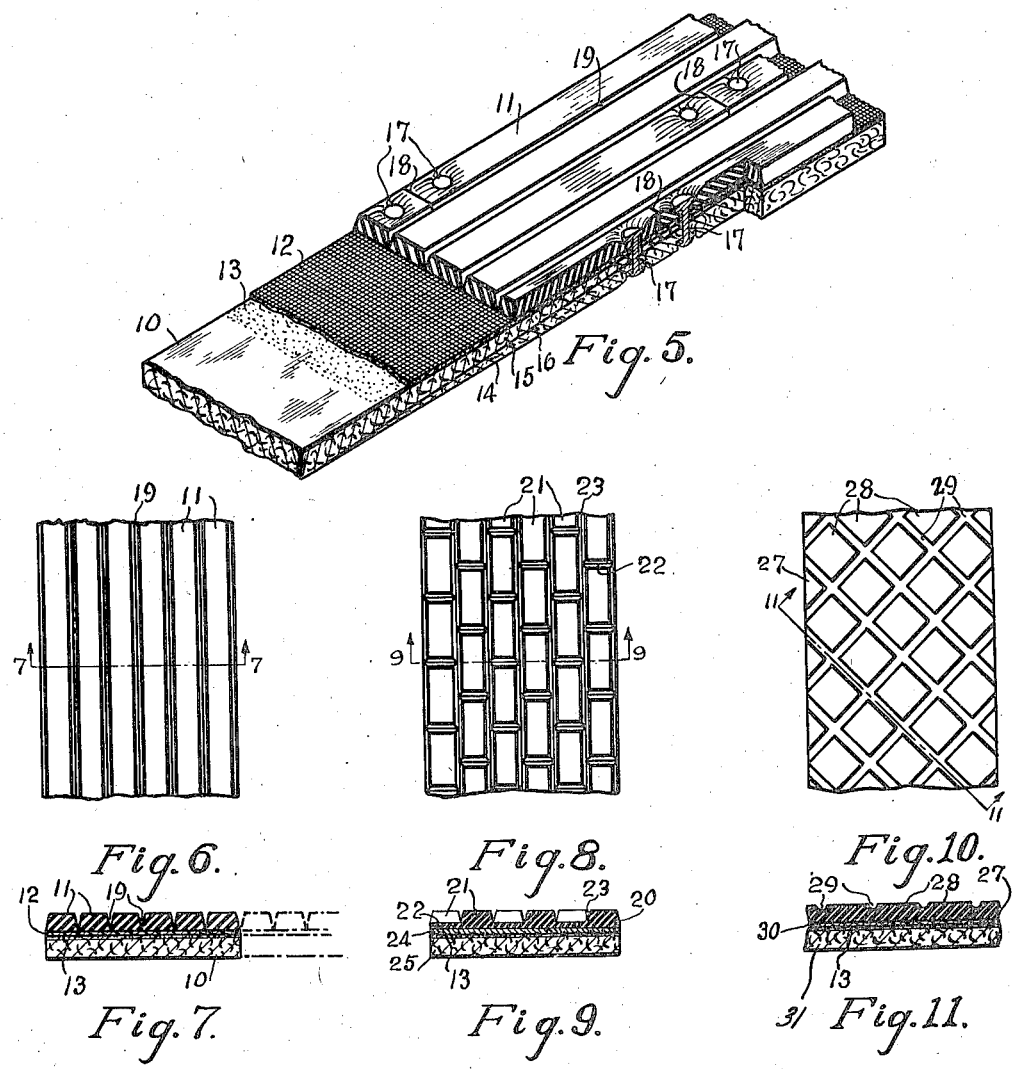
Inventor
ALBERT B. CRUSH Patented Oct. 13, 1936

2,057,419

UNITED STATES PATENT OFFICE 2,057,419

POWER TRANSMISSION BELT AND METHOD OF MAKING THE SAME

Albert B. Crush, Louisville, Ky.

Application June 12, 1934, Serial No. 730,368

10 Claims. (Cl. 74—232)

This invention relates to power transmission belts, and consists of two branches, one as to the belt itself as a structure, and the other as to the method by which such structure is made.

The object of the first branch of my invention is to overcome the tendency of leather power-transmitting belts to slip on the pulleys with which they are used. This slippage lessens the efficiency of the leather belts and also tends to unduly wear them as the leather moves or slips on the metal of the pulley. My object is to overcome these defects.

To that end my invention consists in providing the pulley side of leather belts with means for increasing the friction between the belts and the pulleys. In its preferred form, I carry this invention into effect by combining, with the leather portion or belt proper, a lining or inner layer possessing a higher coefficient of friction than that of the leather. Vulcanized rubber is my preferred material for this purpose.

A further object of the invention is to provide an efficient and economical manner in which the leather and compound friction material shall be united into a homogeneous whole, so as to be, in effect, one piece, without injury to the leather by the use of excessive heat or the use of injurious chemical ingredients which might tend to deteriorate or injure the leather or the friction layer of rubber. This object I carry into effect by vulcanizing a suitable fabric member onto the rubber friction member, and then joining said fabric member to the leather component of the belt by a suitable strong adhesive such as celluloid, cellulose or animal base cement.

Another object is to provide a belt having a rubber portion vulcanized to a woven portion which in turn is secured by adhesive means to a leather portion.

Another object is to provide a belt having a rubber layer which is vulcanized to a rubberized fabric layer, the latter being adhesively joined to a leather layer.

Another object is to provide a belt composed of layers of rubber, fabric and leather joined to one another, the surface of the rubber being uneven, as by having checkering or corrugations.

The object of the second branch of my invention is to provide a method by which the belt can be fabricated in a series of simple steps. These steps are: first, providing a suitable leather band forming the leather component of the belt; second, providing a vulcanized rubber band, or bands, to constitute the friction or pulley contact member of the belt; third, providing a fabric band; fourth, vulcanizing this strip to the rubber member; and fifth, adhesively connecting the rubber-and-fabric assembly to the leather member of the belt.

In the drawings:

Figure 1 is a perspective view of the belt of my invention, with the portions partly separated from one another to show the construction;

Figure 2 is a side elevation of the belt of my invention shown in operation as engaging a pulley;

Figure 3 is a plan view of the belt shown in Figure 1, with the various layers thereof partly broken away to disclose the construction more clearly;

Figure 4 is an enlarged cross sectional view along the line 4—4 of Figure 3;

Figure 5 is a perspective view, partly broken away, of a modified form of belt;

Figure 6 is a plan view of the belt shown in Figure 5;

Figure 7 is a cross section along the line 7—7 of Figure 6;

Figure 8 is a plan view of a modified form of belt with rectangular raised portions on the rubber part;

Figure 9 is a cross section along the line 9—9 of Figure 8;

Figure 10 is a plan view of another modified form of belt, it having diagonal checker work on the rubber part;

Figure 11 is a section along the line 11—11 of Figure 10.

Referring to the drawings in detail, Figure 1 shows the belt of my invention in partly separated form. This belt is of a composite nature and consists of a leather portion 1, and a rubber portion 2. Between the leather and rubber portions 1 and 2, there is preferably interposed a layer of woven material 3, such as a fabric. An adhesive coating 4 is provided to hold the fabric layer 3 in contact with the leather layer 1.

Thus the means of holding the rubber and the fabric layers to the leather layer is such as will avoid the use of heat of a temperature sufficient to injure the leather. The fabric layer 3 may be plain or rubberized.

The method of making the power transmission belt of my invention first involves the preparation of the rubber strip 2 and the leather strip 1.

The fabric strip 3 is then prepared and united to the rubber strip 2 by means of vulcanization. The fabric strip 3 may be previously rubberized to increase the effectiveness of vulcanization and enhance the union of the rubber and textile material. This vulcanization is accomplished in the usual manner, preferably by means of heat.

After the rubber-and-fabric assembly composed of the members 2 and 3 has been prepared, it is then ready to be united to the leather layer 1. In uniting these, I prefer to use means which obviates the need of employing heat of a sufficient degree to injure the leather. I have found that, in attempting to vulcanize rubber and/or fabric directly to leather, the heat employed injures the leather, causes its strength to deteriorate, and materially shortens the life of the belt. The conjunctive agent whereby I join the rubber-and-fabric assembly to the leather portion is preferably a material having adhesive properties. Such an adhesive material which I have found suitable for this purpose is preferably an animal base cement, however, I have successfully employed celluloid, cellulose and other base cements.

The adhesive layer grips the adjacent portions of the belt at all parts of their surfaces in contact with it. By the use of the adhesive means, therefore, stresses are evenly distributed and transferred from one layer to another; and I also avoid the injurious effects which arise from attempting to vulcanize the rubber layer 2 directly to the leather layer 1. In this manner, the length of life and the load-carrying capacity of the belt is effectively increased as compared with belts wherein the leather has been exposed to injurious temperatures during its manufacture.

In operation, the belt of my invention is customarily used in connection with pulleys, as shown in Figure 2. The rubber layer 3 forming the friction surface of the belt engages the driving face 6 of the pulley 7. The latter is arranged to rotate in association with a shaft 8, passing through its hub 9. The rubber layer 3 is possessed of such increased gripping power by reason of its greater coefficient of friction compared with that of leather that it engages the drawing face 6 of the pulley 7 with a more powerful pull and with less slippage than if a plain leather belt were used. At the same time, however, the leather portion 1 provides the strength necessary to carry a load considerably in excess of that capable of being handled by a rubber belt alone. The layer of fabric, moreover, provides a more permanent and durable connection between the rubber layer 2 and the leather layer 1, as well as assisting the holding of the rubber layer 2 to the leather layer 1 by means of the adhesive material 4. The gripping effect of the adhesive material 4 is of greater force when it engages the fabric 3 than when it directly engages the rubber layer 2.

Consequently I have provided a power transmission belt which has a large coefficient of friction providing the great pulling power of a rubber belt, combined with the large load-carrying capacity of a leather belt, and at the same time having a durable connection between the rubber and leather layers. It will be seen that when the belt passes around a pulley of small diameter, as shown in Figure 2, the different layers of the belt have a tendency to move relative to one another somewhat in a shearing manner as well as in a bending manner. The use of an adhesive layer 4 under such conditions is more durable than that of stitches, since the latter tend to wear away and also to lose their strength under the continued flexing during the operation of the belt.

In the modification shown in Figure 5, the leather layer 10 is provided with a plurality of rubber strips 11 backed by a fabric layer 12. The latter is prepared in the same manner as previously described, namely, by being vulcanized to the rubber strips 11. The assembly thus made is then joined to the leather portion 10 by means of an adhesive layer 13. Figure 5 shows the ends of the belt 10, designated as 14 and 15, being united by a lap joint along the plane 16 therebetween. The action of holding the rubber strips 11 to the leather portion 10 is assisted in this instance by the use of rivets 17 passing therethrough. The joints 18 between the successive rubber strips 11 are staggered in their positions. Separating the successive rubber strips 11 are the grooves 19, which here are shown to be of V-shaped cross section.

The modification shown in Figures 8 and 9 generally resembles that shown in Figure 5, but instead of the separate rubber strips 11 therein, the rubber portion 20 of the belt is provided with the raised portions 21 separated from one another by the transverse grooves 22 and the longitudinal grooves 23. It will be seen from Figure 9 that these grooves do not pass entirely through the rubber portion 20, but that the latter has a continuous layer passing entirely across the belt. The fabric layer 24 is vulcanized to the rubber layer 20 and the assembly then attached to the leather layer 25 in a manner similar to that previously described.

The modification shown in Figures 10 and 11 is generally similar to that shown in Figures 8 and 9, but the rubber portion 27 is provided with diagonally-checkered raised portions 28, separated by the grooves 29. The fabric layer 30 is attached to the rubber layer 27 and this assembly attached to the leather layer 31 in a manner similar to that previously described.

In all the modifications shown in Figures 5 to 11 inclusive, the surface of the rubber is uneven, it being provided with alternate raised portions and depressions therebetween. This construction results in an improved operation of the belt under certain conditions.

It will be understood that I desire to comprehend within my invention such modifications as may be necessary to adapt it to varying conditions and uses.

Having thus fully described my invention, what I claim as new and desire to secure by Letters Patent is:

1. In a power transmission belt, a rubber portion, a woven member attached to said rubber portion, and a leather portion adhesively attached to said woven member.

2. In a power transmission belt, a rubber portion, a woven member attached to said rubber portion and having its fibers interpenetrated by rubber, and a leather portion adhesively attached to the opposite side of said woven member.

3. In a power transmission belt, a rubber portion, a woven member attached to said rubber portion, a leather portion, and a layer of adhesive material joining said woven member and said leather portion.

4. In a power transmission belt, a rubber layer, a fabric layer vulcanized to said rubber layer, a leather layer, and an adhesive layer interposed between said fabric layer and said leather layer and adapted to hold said fabric and leather layers together.

5. In a power transmission belt, a rubber portion, a woven member attached to said rubber portion and having its fibers interpenetrated by rubber, a leather portion, and a layer of adhesive material joining said woven member and said leather portion.

6. In a power transmission belt, a rubber layer, a fabric layer vulcanized to said rubber layer, a leather layer, and an intermediate layer of adhesive material between said leather and fabric layers.

7. In a power transmission belt, a rubber portion, a woven member attached to said rubber portion, and a leather portion attached to the opposite side of said woven member, the exposed surface of said rubber layer having raised portions thereon.

8. In a power transmission belt, a rubber layer, a fabric layer attached to said rubber layer, and a leather layer attached to said fabric layer by adhesive means, the exposed surface of said rubber layer having raised portions thereon.

9. In a power transmission belt, a rubber layer, a fabric layer vulcanized to said rubber layer whereby to cause a part of the rubber to interpenetrate the fibers of said fabric layer, a leather layer, and adhesive materials adapted to hold said leather and fabric layers together, said adhesive materials being of different composition from the previously mentioned layers.

10. In a power transmission belt, a rubber layer, a fabric layer attached to said rubber layer by vulcanization, a leather layer, and adhesive materials therebetween adapted to hold said leather and fabric layers together, said adhesive materials being of different composition from the previously mentioned layers, the exposed surface of said rubber layer being provided with raised portions thereon.

ALBERT B. CRUSH.